United States Patent [19]

Hopkins

[11] Patent Number: 4,492,441
[45] Date of Patent: Jan. 8, 1985

[54] VARIABLE STEREOMICROSCOPE

[75] Inventor: Harold H. Hopkins, Reading, England

[73] Assignee: National Research Development Corporation, London, England

[21] Appl. No.: 408,283

[22] Filed: Aug. 16, 1982

[30] Foreign Application Priority Data

Aug. 17, 1981 [GB] United Kingdom ................ 8125085

[51] Int. Cl.³ ............................................. G02B 21/22
[52] U.S. Cl. .................................................. 350/516
[58] Field of Search ............... 350/515, 516, 545, 514, 350/286, 287, 145

[56] References Cited

U.S. PATENT DOCUMENTS 4,009,930  3/1977  Abe et al. ............................. 350/516

FOREIGN PATENT DOCUMENTS 907679   10/1962  United Kingdom ................ 350/516
1139385   1/1969  United Kingdom .

OTHER PUBLICATIONS

"Geometrical and Physical Optics" by R. S. Longhurst, Longmans, on pp. 368 and 369, the Requirements of a Stereomicroscope are discussed.
In "Applied Optics and Optical Engineering", 4 1967 edited by R. Kingslake, Academic Press, on p. 60, J. R. Benford and H. E. Rosenberger disclose An Alternative Microscope Having a Fixed Angle of Stereoscopy and Using Polarised Light.

Primary Examiner—John K. Corbin
Assistant Examiner—Lynn Vandenburgh Kent
Attorney, Agent, or Firm—Cushman, Darby & Cushman

[57] ABSTRACT

A microscope having a variable degree of stereoscopy comprises an objective lens, two eyepiece lenses, and a beam-directing means, such as a prism block, which directs light received from the objective lens to each eyepiece lens and which is movable along the axis of the objective lens.

9 Claims, 3 Drawing Figures

VARIABLE STEREOMICROSCOPE

This invention relates to a microscope which has a high aperture and magnification, and a continuously variable degree of stereoscopy.

In the specification of UK Pat. No. 1,139,385, Bausch and Lomb, a stereomicroscope is described which has a high magnification and a long working distance; this is achieved by providing a pair of apertures offset with respect to the central rays from the axial point of an object to the two eyepiece lens systems. But as disclosed the stereoscopic angle is fixed; while a variable angle could be provided, it would require a mechanically complex linkage system and would result, when operated, in the disadvantage that one eyepiece would be at a different height from the other.

In the present invention, the advantages of high magnification and aperture are retained, but the improved optical system is such that the angle of stereoscopy can be varied and if required reverse stereoscopy can be achieved.

According to the invention, an optical system comprises a front objective lens system; first and second secondary objective lens systems arranged to provide focused images from light received from the objective lens system; and between the front objective lens and the secondary objective lens systems a beam directing means arranged to receive light from the objective lens and to direct a part of said light to each secondary objective lens system, the beam directing means being movable along the axis of the front objective lens with respect to that lens and to the secondary objective lens systems, said movement causing equal variation in the respective angles at the focus of the front objective lens system of the axis of the secondary objective lens system and the optical rays forming the axial ray in each secondary objective lens system, whereby an image having a variable degree of stereoscopy is provided.

The beam directing means may comprise a beam dividing surface arranged to reflect part of the light received from the objective lens system to the first secondary objective lens system, and to transmit the remainder of said light to a reflecting surface which reflects light to the second secondary objective lens system. For example, a prism block movable along the axis may be provided.

In one "neutral" position of the beam dividing means and the reflecting surface, a binocular but non-stereoscopic microscope will be provided. If, however, the beam dividing means and reflecting surface are moved closer to the front objective lens than the "neutral" position a stereomicroscope is provided, and if they are moved further away than the "neutral" position, reverse stereoscopy is achieved. This is so far a microscope in which a final erect image is formed. If the microscope forms an inverted image, raising the beam dividing means will produce stereoscopy, whilst lowering them will produce reverse stereoscopy. The microscope of the invention can therefore be regarded as similar to a conventional binocular microscope but modified to allow movement of the beam divider and reflector. This is the reverse of the normal aim which would be to fix the beam divider and reflector at a precisely defined position.

The invention will now be described by way of example only with reference to the accompanying drawings in which.

Figure 1:
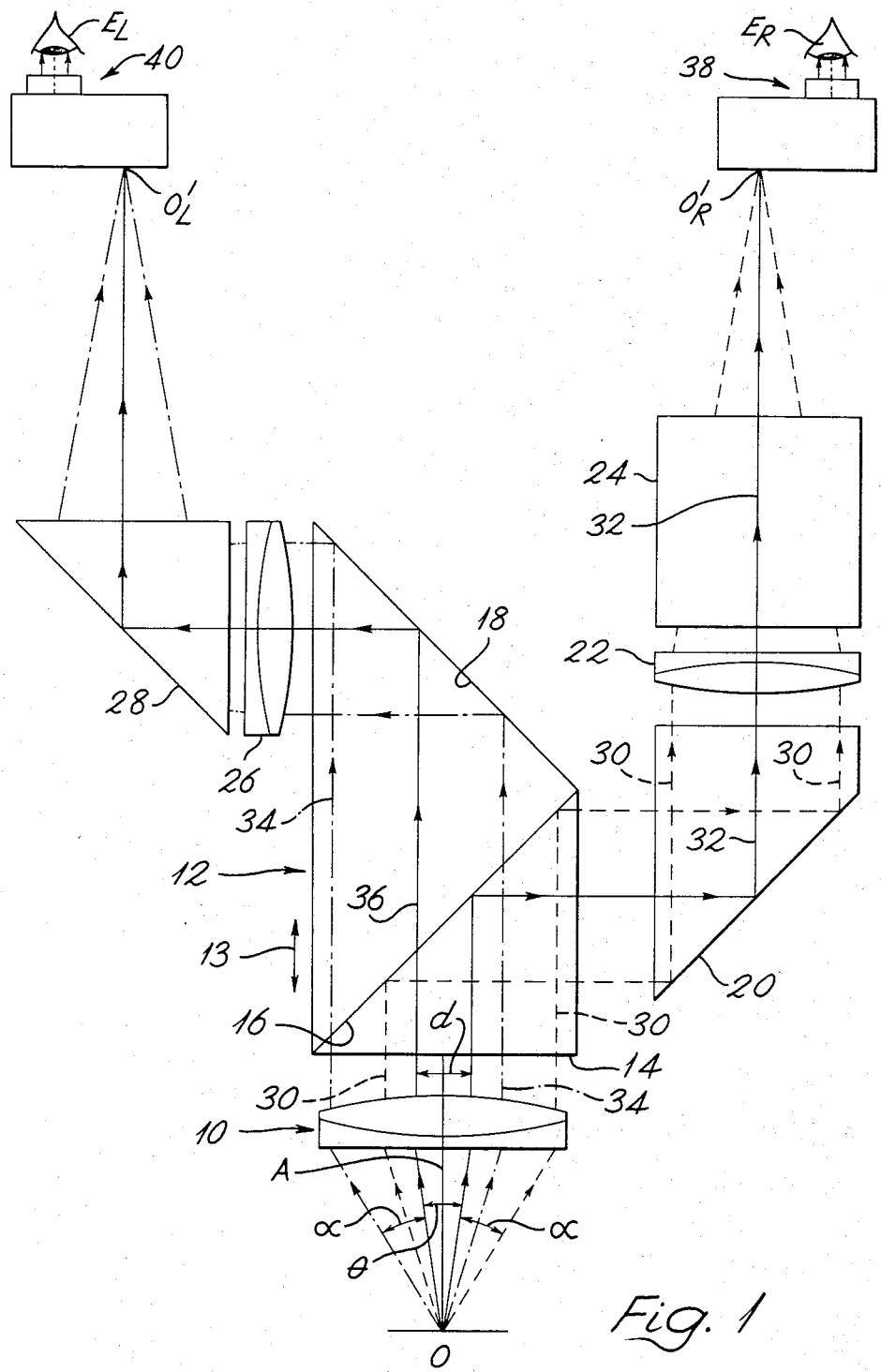
FIG. 1 illustrates schematically the optical arrangement of a variable stereoscopic microscope according to the invention in a position giving a stereoscopic image of an object for the case when an erect final image is formed.

Referring now to FIG. 1, the microscope has a front objective lens system 10 arranged above an object O. In the interests of simplicity, the lens system 10 is here depicted schematically as a single elemental component. For achieving higher numerical apertures, this system would, of course, be of more complex construction. Spaced above the lens system 10 is a prism block 12 having a receiving face 14 perpendicular to the optical axis A of lens system 10, an internal beam-dividing surface 16 at an angle of 45° to the optical axis and a fully reflecting surface 18 above and perpendicular to the surface 16.

On one side of the prism block 12 is a first secondary objective lens system consisting of a reflecting prism 20, a first secondary objective lens 22 and a glass block 24. On the other side of the prism block 12 is a second secondary objective lens system consisting of a second secondary objective lens 26 and a reflecting prism 28. Spaced from the block 24 and the prism 28 are respectively a right and left Porro prism system 38, 40, viewed by right and left eyes $E_R$, $E_L$.

The prism block 12, and therefore the beam-dividing surface 16 and the reflecting surface 18, is movable along the optical axis of the front objective lens 10 as indicated by the arrow 13. A rack-and-pinion mechanism (not illustrated) or any other suitable mechanical arrangement can be used.

Light from the object O is collimated by the front objective lens system 10 and passes through the receiving face 14 to the beam-dividing surface 16. Light reflected through 90° by the surface 16 passes to the prism 20 which reflects it through the first secondary objective lens 22 to form an image $O_R'$ for the right eye. Light transmitted by the surface 16 is reflected through 90° by the surface 18 to pass through the second secondary objective lens 26 and is reflected by the reflecting prism 28 to form an image $O_L'$ for the left eye. The glass block 24 equalises the path lengths in glass. The images $O_R'$, $O_L'$, which are inverted, are viewed through the conventional Porro prism systems 38, 40 to give an erect final image.

In FIG. 1, the position of the prism block 12 with respect to the secondary objective systems is such that each secondary objective lens 22, 26 receives light from a different part of the surface of the objective lens, the two parts overlapping on the central part of the lens. Light forming the image $O_R'$ at the right eye is shown by the two extreme rays 30, (shown as dashes) and a central ray 32. Light forming the image $O_L'$ at the left eye is shown by the two extreme rays 34 (shown chain-dotted) and a central ray 36. At the object, the angle between each extreme ray 30 and the associated central ray 32, and between each extreme ray 34 and the associated central ray 36, is the aperture angle of the microscope. The two central rays 32, 36 lie on opposite sides of the axis of the lens 10 and the angle $\theta$ between them is the angle of stereoscopy of the microscope.

Figure 2:
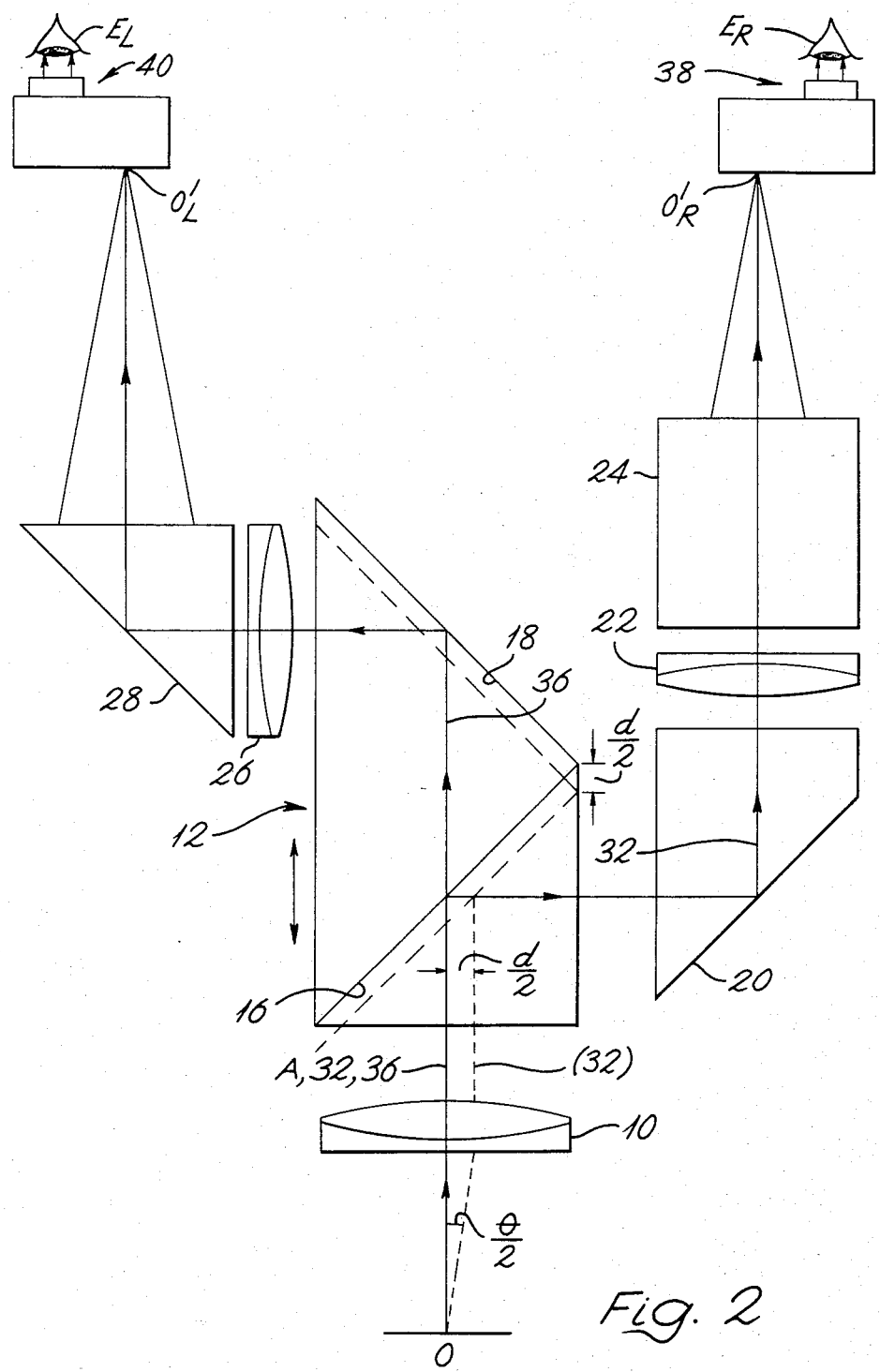
FIG. 2 illustrates the microscope at a "neutral" position at which there is no stereoscopic effect.

In FIG. 2, the effect of moving the prism block 12 away from the objective lens is illustrated. The block is in a "neutral" position; a binocular, non-stereoscopic microscope is provided, i.e. the central rays 32, 36 to each secondary objective lens system coincide in their passage through the front objective lens 10; the extreme rays 30, 34 also coincide but are not shown in FIG. 2; the aperture angle is maintained. The positions of the surfaces 16, 18 in the FIG. 1 arrangement are shown by the broken lines.

From FIGS. 1 and 2 the effect of moving the prism block 12 along the axis of the front objective lens 10 can be seen. Movement from the "neutral" position of FIG. 2 towards the lens, to the FIG. 1 position, generates a stereoscopic effect, the angle of stereoscopy $\theta$ being proportional to the linear movement of prism block 12 from the "neutral" position. Thus by a simple mechanical movement, the angle of stereoscopy $\theta$ can be varied while maintaining a wide aperture angle $\alpha$ and, if desired, a large working distance. This advantage is achieved in this stereomicroscope using a conventional objective lens. It will be seen that $\theta < \alpha$; in contrast, in prior art stereomicroscopes such as the Greenough microscope, $\theta > 2\alpha$, so that having large to achieve high lateral resolution carries with it a high angle of stereoscopy with consequent distortion of perceived space; the microscope of the invention does not have this disadvantage. Further, the microscope is not resolution-blocked by elimination of half of the rays reaching each eyepiece, which is an arrangement used in yet another stereomicroscope.

Referring again to FIG. 1, if the focal length of the lens 10 is F and the separation of the parallel central rays 32, 36 as they leave the lens is d, i.e. the distance of each central ray 32, 36 from the axis of lens 10 is d/2, then:

$$(\sin \theta/2) = (d/2)/F \quad (1)$$

Referring now to FIG. 2, in which the position of central ray 32 corresponding to the FIG. 1 arrangement is shown by a dotted line, by simple geometry the offset of the surface 16 is seen to be d/2.

Rearranging equation (1):

$$d/2 = F \sin \theta/2 \simeq F(\theta/2) \quad (2)$$

Typically F=60 millimeters, $\theta = 10° = 0.18$ radians, therefore d/2=5.4 millimeters. With these values it is expected that a useful range of offset of the prism block 12 would be ±7 millimeters from the "neutral", FIG. 2, position. Typical corresponding apertures will be a numerical aperture $\sin \alpha = 0.40$, and a numerical aperture of the objective lens 10 of 0.55.

Figure 3:
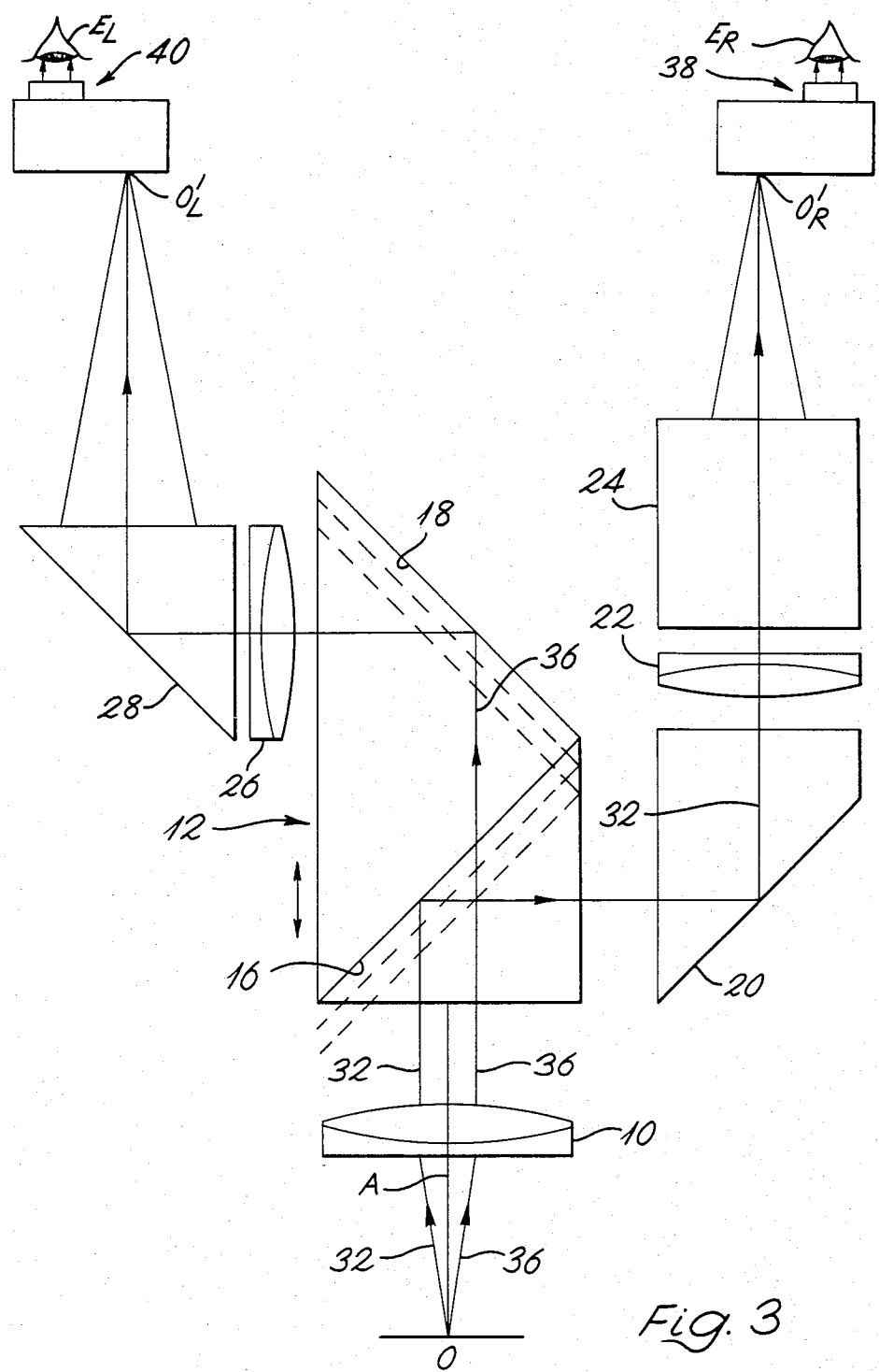
FIG. 3 illustrates a microscope having reverse stereoscopy for the case when an erect final image is formed.

In FIG. 3 the prism block 12 has been moved even further from the front objective lens 10 than the "neutral" position; the positions of surfaces 16 and 18 corresponding to FIGS. 1 and 2 are shown by the broken lines. By inspection of the central rays 32, 36, it can be seen that the image $O_R'$ at the right eye is provided by light from the left hand part of the surface of lens 10, and the image $O_L'$ at the left eye from the right hand part. Thus stereoscopy is reversed in a microscope giving an erect image. This effect may also be used to give true stereoscopic perception of depth (but an inverted image) if the Porro prism systems 38, 40 are removed.

From FIGS. 1, 2 and 3 it can easily be seen that the distances of the images $O_R'$, $O_L'$ from the object O are equal to each other and unchanged in all three illustrated positions of the prism block 12, i.e. the positions of the viewer's eyes are at the same distance, whatever the stereoscopic effect, with no need to offset one eye.

I claim:

1. An optical system comprises a front objective lens system; first and second secondary objective lens systems arranged to provide focused images from light received from the front objective lens system; and between the front objective lens and the secondary objective lens systems a beam directing means arranged to receive light from the objective lens and to direct substantially a full aperture part of said light to each secondary objective lens system, the beam directing means being movable along the axis of the front objective lens system with respect to that lens and to the secondary objective lens systems, said movement causing equal variations in the angle subtended at the focus of the front objective lens system by the rays forming corresponding points of the respective images formed by each secondary objective lens system whereby an image having a variable degree of stereoscopy is provided.

2. An optical system according to claim 1 in which the beam directing means comprises a beam dividing surface arranged to reflect part of the light received from the front objective lens system to the first secondary objective lens system, and to transmit the remainder of the said light to a reflecting surface which reflects light to the second secondary objective lens system.

3. An optical system according to claim 2 in which the beam dividing surface and the reflecting surface comprise two surfaces of a prism block which is movable along the axis of the front objective lens system.

4. An optical system according to claim 1 in which the aperture angle is greater than the angle of stereoscopy.

5. An optical system according to claim 1 in which there is a neutral position of the beam directing means along the axis of the front objective lens system at which a binocular, non-stereoscopic image is formed by the first and second secondary objective lens systems.

6. An optical system according to claim 5 in which the beam directing means can be moved from the neutral position in either direction along the axis of the front objective lens system whereby a stereoscopic or a reverse stereoscopic image can be provided.

7. An optical system according to claim 5 in which the beam directing means receives a collimated beam from the front objective lens, and a movement through distance d/2 of the beam directing means from the neutral position causes a change in the angle of stereoscopy $\theta$ given by the relationship $d/2 = F \sin \theta/2$, where F is the focal length of the front objective lens.

8. An optical system comprises a front objective lens system; first and second secondary objective lens systems arranged to provide focused images from light received from the front objective lens system; and between the front objective lens and the secondary objective lens systems a beam directing means arranged to receive light from the front objective lens and to direct substantially a full aperture part of said light to each secondary objective lens system, the beam directing means being movable along the axis of the front objective lens with respect to that lens and to the secondary objective lens systems, said movement causing a variation in the angle of stereoscopy of the system.

9. A variable stereomicroscope comprising an optical system according to claim 1, and two Porro prism systems arranged respectively to receive light from the first and second eyepiece lens systems.

* * * * *